W. H. CARTER.
NUT LOCK.
APPLICATION FILED APR. 7, 1913.
1,094,527.
Patented Apr. 28, 1914.
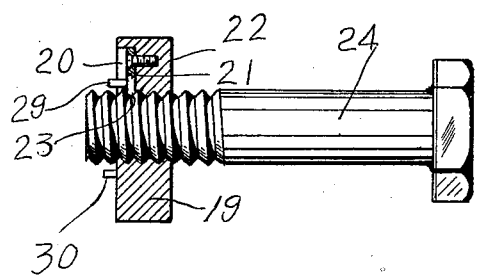
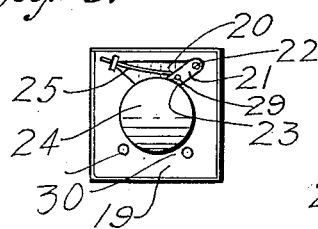
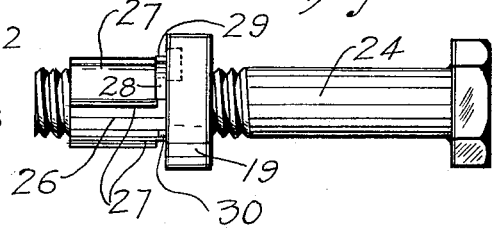
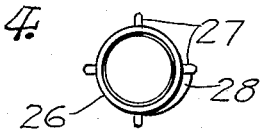
Witnesses
Robert M. Sutphen.
A. L. Hug.
Inventor
W. H. Carter
By Watson E. Coleman
Attorney

UNITED STATES PATENT OFFICE.

WILLIAM H. CARTER, OF SULPHUR, OKLAHOMA.

NUT-LOCK.

1,094,527.

Specification of Letters Patent.

Patented Apr. 28, 1914.

Application filed April 7, 1913. Serial No. 759,478.

*To all whom it may concern:*

Be it known that I, WILLIAM H. CARTER, a citizen of the United States, residing at Sulphur, in the county of Murray and State of Oklahoma, have invented certain new and useful Improvements in Nut-Locks, of which the following is a specification, reference being had to the accompanying drawings.

This invention comprehends certain new and useful improvements in nut locks and has for a primary object to provide a self-locking nut of extremely simple construction and which will be highly efficient and effective in use and which will be constructed in such manner that the locking member will be held in inoperative or ineffective position during removal of the nut.

Another object is to provide a lock nut of this character which will be automatically locked upon the bolt and which will have its locking mechanism constructed in such manner that a portion of the mechanism will project beyond the edge of the nut to be engaged by the tool employed for unlocking the nut and held from engagement with the bolt, by the tool during removal of the nut.

Another object is to generally improve and simplify the construction of devices of this character and increase the efficiency of the same.

With the above and other objects in view, this invention consists in the novel features of construction, combination and arrangement of parts to be hereinafter more fully described, claimed and illustrated in the accompanying drawings, in which—

Figure 1 is a longitudinal section through my improved nut lock in position upon a bolt of conventional form. Fig. 2 is an end elevational view thereof. Fig. 3, is a side elevational view of the same, with the threaded key applied to disengage the locking pawl and retain said pawl in inoperative position during removal of the nut and key. Fig. 4, is an end elevational view of the key, removed, looking at the outer end thereof.

Referring more specifically to the drawings in which similar reference characters designate corresponding parts throughout the several views, 19 designates a nut provided in its upper face with the substantially triangular form recess 20 which has two of its corners directed toward adjacent corners of the nut and its remaining or inner corner communicating with the longitudinal bore of the nut. Pivoted in one of the outer corners of the recess 20 is the locking member or pawl 21 which is mounted upon the pivot screw or pin 22. The locking member 21 has its free end concaved and provided with bolt engaging teeth, as shown at 23, for engagement with the bolt 24 between the threads of the latter to lock the nut upon the bolt, the locking member 21 being normally held in engagement with the bolt by means of the leaf spring 25 which has one end engaged against one side of the member 21 while the opposite end of the spring is secured in the remaining corner of the recess. The other side of the member 21 is engaged against one wall of the recess when said member 21 is in engagement with the bolt 24.

For the purpose of disengaging the locking member or pawl 21 from the bolt and removing the nut 19, I have provided a key 26 which is in the form of an internally threaded sleeve and adapted for threaded engagement with the bolt 24, said key having longitudinal ribs 27 by means of which the key may be readily rotated, said ribs also serving to reinforce and strengthen the key, one of said ribs 27 being at the inner or large end of the releasing cam 28 and being longer than the remaining ribs 27. The key is provided with the releasing cam 28 upon its exterior surface at its inner end beneath certain of the short ribs 27 for engagement against the release pin 29 carried upon the outer face of the locking member or pawl 21 adjacent the inner end of the latter and as the key 26 is rotated to its position against the outer face of the nut, said cam 28 engages the release pin 29 and thereby swings the locking member or pawl 21 outwardly upon its pivot screw or pin 22 and against the tension of the spring 25. The key 26 is guided to and held in proper position as it reaches the nut 19, by means of two or more guide pins 30 which are carried upon the outer face of the nut, and adapted for engagement with the outer face of the key to force the same toward the release pin 29, as the lower or inner end of said key rotates between said pins, to position against the nut 19, it being understood that the key 26 is of such diameter as to be loosely engaged upon the bolt 24 and rotate freely upon the same. After the key 26 has been properly engaged with the nut 19, said nut and key may be readily rotated to remove the nut 19 from the bolt 24, as will be clearly apparent.

While I have shown the preferred embodiments of my invention, I do not wish to be limited to the specific construction shown and described in this application, as many minor changes in the details of construction may be made within the scope of the appended claims without departing from the spirit of my invention.

Having thus described my invention, what I claim is:—

1. The combination with a bolt, of a nut threaded upon said bolt and provided with a spring controlled pawl having a laterally projecting stud, the pawl being normally engaged with the threaded portion of the bolt to lock the nut against reverse rotation, and a key adapted for rotary movement upon the threaded portion of the bolt and provided with a cam projection for engagement against the stud to disengage the pawl from the bolt.

2. A lock nut and key comprising the combination with a bolt, of a nut threaded upon the bolt, a locking pawl carried by the nut and normally engaged with the bolt to lock the nut in position, a key having threaded engagement upon the bolt and engagement with the pawl to force the same away from the bolt, and means carried by the nut for engagement with the key to guide said key into proper engagement with the pawl to force the latter from engagement with the bolt.

3. A nut lock and key comprising the combination of a nut having a spring pressed pawl with a stud projecting laterally therefrom, with a bolt positioned through the nut, the pawl being normally engaged with the bolt and having a concave engaging end provided with teeth for engagement against the bolt, and a key for engagement upon the bolt and against the nut and provided with a cam projection and a stop for engagement with the stud of the cam to force the same away from the bolt.

4. A nut lock comprising the combination with a bolt, of a nut, a locking member carried by the nut and engaged with the bolt to prevent removal of the nut, said locking member carrying a lateral projection, and a key for engagement upon the bolt and having a cam projection for engagement with the lateral projection of the locking member to disengage the latter from the bolt and hold the same in inoperative position during removal of the nut.

In testimony whereof I hereunto affix my signature in the presence of two witnesses.

WM. H. CARTER.

Witnesses:
CHAS. H. PARKER, Jr.,
C. L. WILKERSON.

---

Copies of this patent may be obtained for five cents each, by addressing the "Commissioner of Patents, Washington, D. C."